(12) United States Patent
Nomura et al.

(10) Patent No.: US 7,035,259 B2
(45) Date of Patent: Apr. 25, 2006

(54) LABEL SWITCH NETWORK SYSTEM

(75) Inventors: Yuji Nomura, Kawasaki (JP); Akira Chugo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 09/800,150

(22) Filed: Mar. 5, 2001

(65) Prior Publication Data

US 2001/0019554 A1 Sep. 6, 2001

(30) Foreign Application Priority Data

Mar. 6, 2000 (JP) .............................. 2000-060735

(51) Int. Cl.
*H04L 12/28* (2006.01)
*H04L 12/56* (2006.01)

(52) U.S. Cl. ................... 370/392; 370/254; 370/401

(58) Field of Classification Search ............... 370/392, 370/389, 352, 216, 217, 218, 225, 227, 228, 370/254, 255, 395, 398, 395.2, 395.21, 400, 370/401, 465, 466, 469
See application file for complete search history.

(56) References Cited

U.S. PATENT DOCUMENTS

| | | | | | |
|---|---|---|---|---|---|
| 6,026,077 | A | * | 2/2000 | Iwata .......................... | 370/254 |
| 6,081,513 | A | * | 6/2000 | Roy ............................ | 370/260 |
| 6,363,319 | B1 | * | 3/2002 | Hsu ............................ | 701/202 |
| 6,678,264 | B1 | * | 1/2004 | Gibson ....................... | 370/352 |
| 6,680,943 | B1 | * | 1/2004 | Gibson et al. .............. | 370/392 |
| 6,697,329 | B1 | * | 2/2004 | McAllister et al. ......... | 370/235 |
| 6,744,767 | B1 | * | 6/2004 | Chiu et al. ............. | 370/395.21 |
| 6,760,775 | B1 | * | 7/2004 | Anerousis et al. .......... | 709/238 |
| 6,775,280 | B1 | * | 8/2004 | Ma et al. ..................... | 370/392 |
| 6,882,643 | B1 | * | 4/2005 | Mauger et al. ............. | 370/389 |
| 2001/0016914 | A1 | * | 8/2001 | Tabata ........................ | 713/201 |
| 2001/0039576 | A1 | * | 11/2001 | Kanada ....................... | 709/223 |
| 2002/0126633 | A1 | * | 9/2002 | Mizutani et al. ............ | 370/329 |

OTHER PUBLICATIONS

Notification of Reason for Rejection dated Sep. 6, 2005 with translation.
Norihito Fujita, et al. Implementation of MPLS based IP-Qos Traffic Engineering System. Technical Report of the Institute of Electrics, Information and Communication Engineers. Oct. 28, 1999 vol. 99, No. 404, with partial translation.

* cited by examiner

*Primary Examiner*—Brian Nguyen
(74) *Attorney, Agent, or Firm*—Katten Muchin Rosenman LLP

(57) ABSTRACT

The present invention relates to label switch networks and allows for reducing the processing cost and processing time required at each node when various services are performed with respect to traffic engineering in the label switch networks including a multi-protocol label switching (MPLS) network. In a label switch network system a first node that is disposed at the ingress of the label switch network transfers IP packets corresponding to IP flows based on labels, and that selects and sets up layer 2 paths for transferring the IP packets with reference to header or payload information of the IP packets. A plurality of second nodes may be disposed at intermediate points of the network and they set up the layer 2 paths from the ingress to the egress of the network following the specified routes and a third node is disposed at the egress of the network. A policy server instructs the first node to set up the layer 2 paths in compliance with policy control protocols when a user makes a request or a status change in the network arise, and intensively controls the first node, the second nodes and the third node.

23 Claims, 12 Drawing Sheets

LABEL SWITCH NETWORK SYSTEM

BACKGROUND OF THE INVENTION

This invention relates to a label switch network system or a policy server and particularly a label switch network system that realizes traffic engineering by intensively controlling various flows in the label switch network or a policy server used in the label switch network system.

In recent years, research and development on PBN (Policy Based Networking) and its application have been promoted with the aim of making IP (Internet Protocol) networks more sophisticated and simplifying its management and administration (Y. Nomura, et al., "Policy Based Networking Architecture for Enterprise Networks", ICC' 99, 1999).

Also, the MPLS (Multi Protocol Label Switching) technique has been attracting attention. The technique has introduced a new concept, "a label", for transferring IP packets and can perform IP level (layer 3: L3) routing by a switching process in lower layers (layer 2:L2) such as ATM (Asynchronous Transfer Mode), frame intermediate and Ethernet (Rosen, et al., "Multiprotocol Label Switching Architecture", work in progress (IETF-Draft), 1999).

Especially, for label switch networks (hereinafter sometimes referred to as label networks), such as the MPLS network, it is crucial to realize traffic engineering including an optimal route set-up for every flow, load sharing and bypassing failures.

To provide service regarding traffic engineering, such as setting up optimal routes for every flow (setting up explicit routes in consideration of QoS (Quality of Service), and aggregates of IP flows), traffic load sharing and improving failure tolerance by setting up redundant links in the label switch networks, it is generally required to set up appropriate L2 paths by collecting information on the utilization conditions of the networks or to select L2 paths appropriate for transmitting IP traffic out of existing (already set up for a call) L2 paths. Here, a label network means an ATM network and L2 paths mean connections specified by such identifiers as VPI and VCI.

The abovementioned service of the past has been provided in the MPLS networks having a system configuration illustrated in FIG. 1. In the MPLS network, every node is a label switching router LSR having a layer 3 (IP level) router function. LSRs (from LSR1 to LSR5 in FIG. 1) basically have a function of selecting and setting up L2 paths utilized for communicating arbitrary IP flows and a function of setting up L2 paths leading from the ingress to the egress of the MPLS network by intermediateing control messages for setting up the L2 path between LSRs hop by hop. These control messages contain transmission quality parameters set at the ingress LSR and parameters that explicitly specify LSRs to be intermediateed.

In order to realize various services made available by MPLS, selecting appropriate L2 paths is a critical function. Since in the prior MPLS network distributed controls among LSRs are premised, it is necessary for one LSR to know the status of other LSRs using communications protocols among LSRs and not only to maintain and manage the status information but also to calculate appropriate L2 paths on the basis of such status information so that the LSR may select appropriate L2 paths in the whole MPLS network.

For the above purpose, each LSR needs to perform a protocol process for distributing and collecting the status information, maintain and manage the status information of other LSRs and calculate L2 paths.

In the distributed control method where the status information is exchanged with adjacent LSRs hop by hop, processing time in proportion to the number of hops among LSRs is required until the whole network receives the status information.

In addition, the redundant link service cannot switch paths quickly when a failure arises in a working path, unless spare paths were set in the MPLS networks beforehand. Therefore it is necessary to set aside bandwidth for the spare paths beforehand. However the secured resources (including bandwidth for spare paths) cannot be utilized in normal use, thus lowering the resource utilization efficiency.

Also, the conventional MPLS network directly deals with mapping (matching) of IP flows and LSP (Label Switched Path), it is necessary to switch lines at LSRs as many times as the number of the IP flows when the lines need to be switched and thus managing cost and processing cost utilizing thereof becomes high.

The results of the above is that in a conventional MPLS network wherein the distributed control method is employed, to realize the above various services, not only the cost and processing time inevitably increase but also efficiency of resource utilization becomes low.

SUMMARY OF THE INVENTION

Accordingly, the first object of the present invention is to provide a label switch network system that enables a reduction in cost and processing time at each node in realizing various services with respect to traffic engineering in the label switch network including the MPLS network.

The second object of the present invention is to provide a label switch network that makes it possible for a policy server to set up paths that will keep the network utilization balanced with respect to traffic load balancing.

The third object of the present invention is to provide a label switch network that makes it possible to switch paths quickly in a redundant link service when a line failure occurs.

The fourth object of the present invention is to provide a label switch network that makes it possible in a redundant link network to utilize service resources efficiently.

The fifth object of the present invention is to provide a label switch network that allows a reduced processing cost at the time of switching lines.

To accomplish the above objects, a label switch network system according to a first aspect of the present invention comprises a first node that is disposed at the ingress of the label switch network that transfers IP packets corresponding to IP flows based on the labels, and that selects and sets up layer 2 paths for transferring the IP packets with reference to the header or payload information of the IP packets, a plurality of second nodes that are disposed at the intermediate points of the network and set up the layer 2 paths from the ingress to the egress of the network by the specified routes, a third node disposed at the egress of the network, and a policy server that instructs the first node to set up the layer 2 paths in compliance with policy control protocols when a user request or a status change of the network arise, and controls the first node, the second node and the third node.

In a label switch network system according to a second aspect of the present invention, the policy server has a unit for detecting the user request or the status change in the network of the first label switch network system, a unit for determining whether existing layer 2 paths are selected or the layer 2 paths following appropriate routes are to be newly set up, for the purpose of transferring the IP packets, a unit for calculating appropriate routes of the layer 2 paths and quality assurance parameters, and a unit for instructing the first node to set up the layer 2 paths.

In a label switch network system according to a third aspect of the present invention, the first node has a unit for notifying the policy server of the user request or the status change in the network of the first label switch network system when the first node detects the user request or the status change in the network for itself or is notified by any of the second nodes and the third node, and the policy server has a unit for instructing the first node to set up the layer 2 paths for transferring the IP packets corresponding to newly generated IP flows, in response to the notices sent by the first node.

In a label switch network system according to a fourth aspect of the present invention, each of the second nodes has a unit for routing the IP packets in the first label switch network system and a unit for setting up the layer 2 paths following the routes specified by the IP addresses contained in the IP packets, and the policy server has a unit for specifying one of the second nodes through which the layer 2 path can pass in accordance with the IP address corresponding to one of the second nodes.

In a label switch network system according to a fifth aspect of the present invention, when a plurality of the layer 2 paths through which IP flows can pass exist and new IP flows generated by the user request or the status change in the network are detected, the policy server has a unit for searching for routes that will keep the utilization conditions of the resources of the network of the first label switch network system balanced despite the new IP flows, in accordance with the utilization conditions of the resources of each physical line collected beforehand, and a unit for instructing the first node to set up the layer 2 paths that can communicate the new IP flows generated by the user request or the status change in the network.

In a label switch network system according to a sixth aspect of the present invention, the first node in the first label switch network system has a unit for collecting and managing the utilization conditions of the layer 2 paths, and a unit for selecting the layer 2 paths appropriate for transferring IP flows based on the utilization conditions of a plurality of the layer 2 paths, if the plurality of layer 2 paths through which IP flows can pass exist, and when the policy server detects new IP flows generated based on the user request or the status change in the network, the policy server has a unit for instructing the first node to set up a plurality of the layer 2 paths that can transfer the newly generated IP flows, and a unit for instructing the first node to select the layer 2 paths appropriate for either the IP packets or the IP flows as a unit so that transferring the new IP flows may not cause any imbalance in the utilization conditions of the plurality of layer 2 paths with each other.

In a label switch network system according to a seventh aspect of the present invention, when a plurality of the layer 2 paths through which IP flows can pass exist and new IP flows generated based on the user request or the status change in the network are detected, the policy server in the first label switch network has a unit for searching for at least two different routes for newly generated the layer 2 paths, which meet the user request, setting up the layer 2 paths for transferring the new IP flows, and designating one of the layer 2 paths as a working path and the other as a spare path in accordance with the utilization conditions of the resources of each physical line collected beforehand, and has a unit for instructing the first node to switch the working path to the spare path, based on the judgement of the second or third nodes when the second or third node detect that a failure makes it impossible to use the working path, and the first node has a unit for switching the working path to the spare path when the working path detects by itself that a failure makes it impossible to use the working path.

In a label switch network system according to an eighth aspect of the present invention, the policy server in the abovementioned seventh label switch network system has a unit for instructing the first node to use the spare path by other traffic when the working path is normally operating, and to stop other traffic which is using the spare path and to make the spare path accommodate the traffic which the working path was transferring when a failure arises in the working path.

In a label switch network system according to a ninth aspect of the present invention, when one of the layer 2 paths transfers the IP packets corresponding to a plurality of different IP flows, the policy server, the first node and second nodes have a unit for defining logical groups to which a plurality of IP flows belong and group identifiers for identifying the logical groups and a unit for specifying the plurality of IP flows belonging to the group by the group identifiers when one of the layer 2 paths is switched, and the policy server has a unit for giving instruction to the first node so as to map IP flows and the layer 2 paths match with each other, using the group identifiers when one of the layer 2 paths is switched.

The present invention enables the policy server to exclusively possess the functions distributed to and possessed by each node in the conventional label switch systems including MPLS, whereby the functions and processes at each node are made unnecessary and thus, reduction in processing cost and time at each node can be achieved.

In other words, in the present invention, since the policy server exclusively collects and manages the status information and calculates L2 paths, each node needs nothing but a function to notify the policy server of the status information, and the nodes can share the functions of the policy server. Therefore, processes at each node required up to now including those of maintaining and managing the status of other nodes, those of distributing and collecting them, and those of calculating the L2 paths become unnecessary. As a result, the number of messages of status notification and collection that the nodes required is reduced and it also becomes possible to reduce the number of processes.

In the conventional method, the status information was exchanged hop by hop among the adjacent nodes in the whole network and the process time was required in proportion to the number of hops among the nodes until the status information reached the whole network. Since in the present invention, all that the nodes have to do is to notify the policy server of the status, it is made unnecessary to exchange information hop by hop and process time is reduced.

Since the policy server executes all the processing of calculating appropriate L2 paths in reference to the status information and notifies nodes of the obtained result, it is unnecessary for each node to have the function of calculating the L2 paths and possible to constitute nodes at a low cost.

Also, the present invention makes it possible for a policy server to set up paths in respect of the traffic load sharing service so as not to make any imbalance in the network utilization.

Further, according to the present invention, through the introduction of redundant links, the present invention makes it possible to switch paths quickly when a failure arises. Namely, if the intermediate or egress nodes detect that a failure has made it impossible to use a working path, the policy server instructs the ingress node to switch the working path to a spare path based on the judgement of the intermediate or egress nodes and that results in a quick path switching.

In addition, the present invention makes it possible to make efficient use of the network resources by introducing redundant links. The redundant links of the present invention make it possible for the policy server to instruct use of the spare path for the transmission of other IP flows and thus enables more IP flows to be transmitted despite the same circuit capacity. As a result, a reduction in the cable cost per IP flow can be achieved.

Also, the present invention enables the process cost to be reduced at the time of switching lines. In other words, since in the present invention a plurality of IP flows are classified into groups and a switching process is completed by only specifying the groups at the time of switching lines, a process conducted for each IP flow is no longer necessary, and processing time and the number of processes can be reduced.

BRIEF DESCRIPTION OF THE DRAWINGS

The foregoing and other features and advantages of the present invention will become more readily more appreciated as the same becomes better understood by reference to the following detailed description when taken into conjunction with the accompanying drawings wherein.

DESCRIPTION OF THE PREFERRED EMBODIMENTS

Embodiments of the present invention will be explained with reference to the drawings.

Basic Configuration of Label Switch Network System

Figure 1:
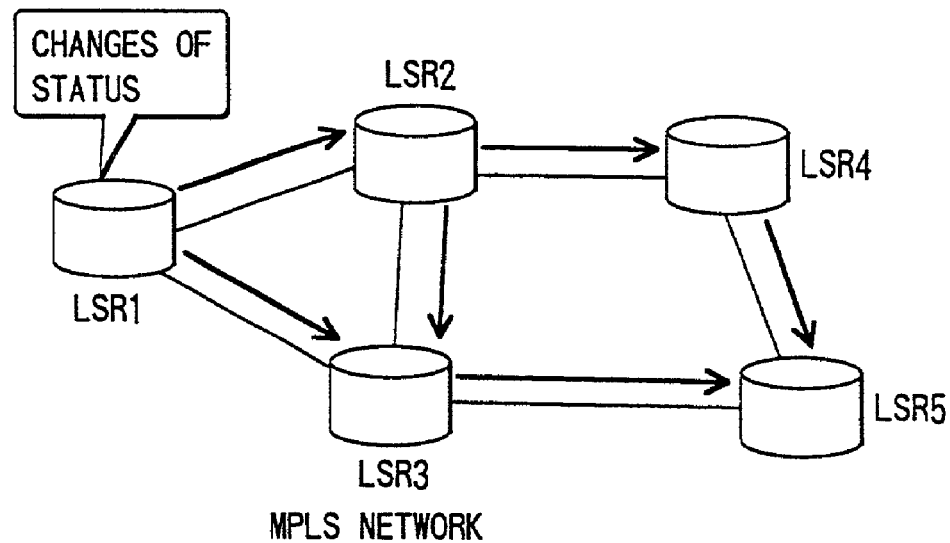
FIG. 1 is a block diagram showing a configuration example of the prior label switch network system.
Figure 2:
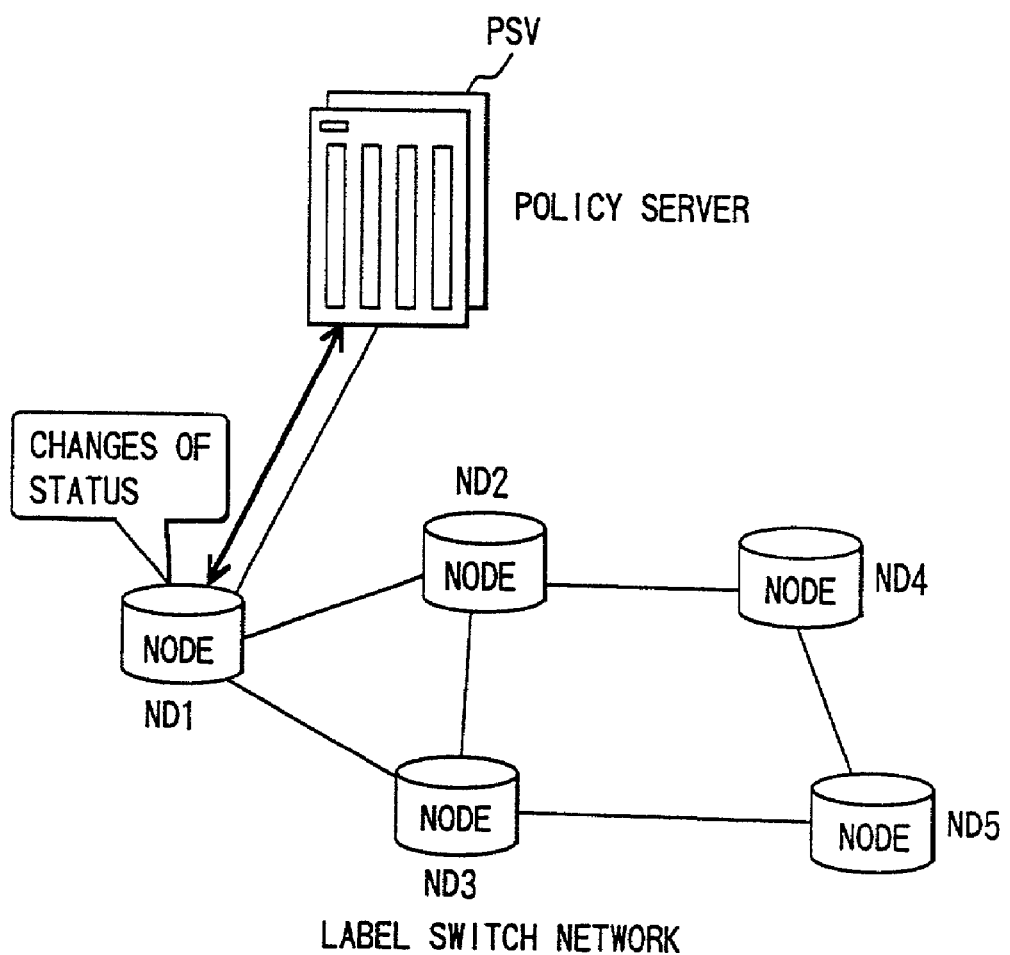
FIG. 2 is a block diagram showing a basic configuration of the label switch network system according to one embodiment of the present invention.

Referring to FIG. 2 that shows a basic configuration of the label switch network system according to one embodiment of the present invention, the label switch network system (a label network) is formed of a policy server PSV, and a plurality of nodes ND1, ND2 to ND5.

A policy server PSV is connected to a node ND1 disposed at the ingress of the label switch network by a physical line (a physical link). ND1 disposed at the ingress of the network and ND5 disposed at the egress of the network are connected by way of the intermediate (core) nodes, ND2, ND3 and ND4, and a physical line (physical link). The ingress node ND1 and the egress node ND5 are connected to other IP networks (illustration omitted), respectively.

The policy server PSV determines operations of the nodes from ND1 to ND5, based on user information, policy (management guidelines) information and the whole network conditions. The policy server PSV obtains the user information and policy information from a directory server (illustration omitted) that registers and stores such information. The ingress node ND1, the intermediate nodes ND2, ND3 and ND4, and the egress node ND5 comprise network equipment such as routers and switches and execute operations in accordance with the decision of the policy server PSV.

The policy server PSV intensively controls the nodes from ND1 to ND5 in compliance with the policy control protocols including COPS (Common Open Policy Service) for the purpose of providing services in respect of traffic engineering such as setting up an optimal route for every IP flow (setting up an explicit route in consideration of Q.o.S., and aggregates of IP flows), traffic load sharing and improvement of failure resistance by introducing redundant links. In respect of the COPS protocol, J. Boyle, et al., "The COPS Protocol", RFC2748, IETF, 2000 can be referred.

Next, with reference to FIG. 3, the configurations of the policy server PSV and the nodes from ND1 to ND5 will be explained in detail.

The policy server PSV comprises a network resource status managing portion 10 that is notified by the nodes from ND1 to ND5 and receives and collects information about the status of the nodes and administers status information, a user request receiving and processing portion 11 that determines whether or nor the user's requests should be permitted, and an event detection portion 12 that recognizes network status changes and detects events such as generation of new IP flow or disappearance of IP flows.

The policy server PSV further comprises a path searching portion 13 that calculates routes for L2 (layer 2) paths transmitting new IP flows when new IP flows are generated based on users' requests or network status changes (status information) within the label network, an L2 path creation determining portion 14 that determines whether an existing L2 path (that is already set in a call status) should be used or a new L2 path should be created, an L2 path creating portion 15 that determines quality assurance parameters and routes for L2 paths when they are set up, and a set-up transmitting portion 16 that transmits the above created L2 path information.

As the basic configuration, each of the nodes from ND1 to ND5 comprises a set-up processing portion 20 that receives and executes set-up instructions from the policy server PSV, a status notifying portion 21 that notifies the policy server PSV of the status of the nodes themselves and a label switch function portion 22 that distributes labels for the purpose of mapping the IP flows conventional labels have (layer 3:L3) and L2 paths and setting up L2 paths hop by hop.

Herein, the ingress node ND1 directly transmits and receives set-up instructions in compliance with the policy server PSV and policy control protocols, however the intermediate nodes ND2, ND3 and ND4, and the egress node ND5 transmit and receive information from the policy server through the ingress node ND1.

In the abovementioned switch network system, the policy server PSV has the network resource status managing portion 10, the user request receiving and processing portion 11, the event detection portion 12, the path searching portion 13, the L2 path creation determining portion 14 and an L2 path creating portion 15, which formed each node in the conventional label networks including MPLS, and by communicating with the policy server PSV, each of the nodes from ND1 to ND5 shares these functions.

The policy server PSV exclusively administers these functions and has a set-up transmitting portion 16 for giving the nodes from ND 1 to ND5 set-up instructions, if such instructions are needed. The nodes from ND1 to ND5 comprise the function portions 20, 21 and 22 that receive and execute the set-up instructions from the policy server PSV.

Thus, the policy server PSV and the nodes from ND1 to ND5 share the functions and the policy server PSV exclusively administers the status and makes a decision on setting up paths. Up to now the nodes have exchanged network status information among the nodes, but now the policy server PSV deals with the process inside thereof and each node has alleviated the amount of processing to be done. Also, in respect of various services in the label network including MPLS, the policy server PSV gives instructions on the utilization of L2 paths to the nodes from ND1 to ND5, thus settings required for realizing services are achieved.

First Specific Configuration and Operation of Label Switch Network System

Figure 4:
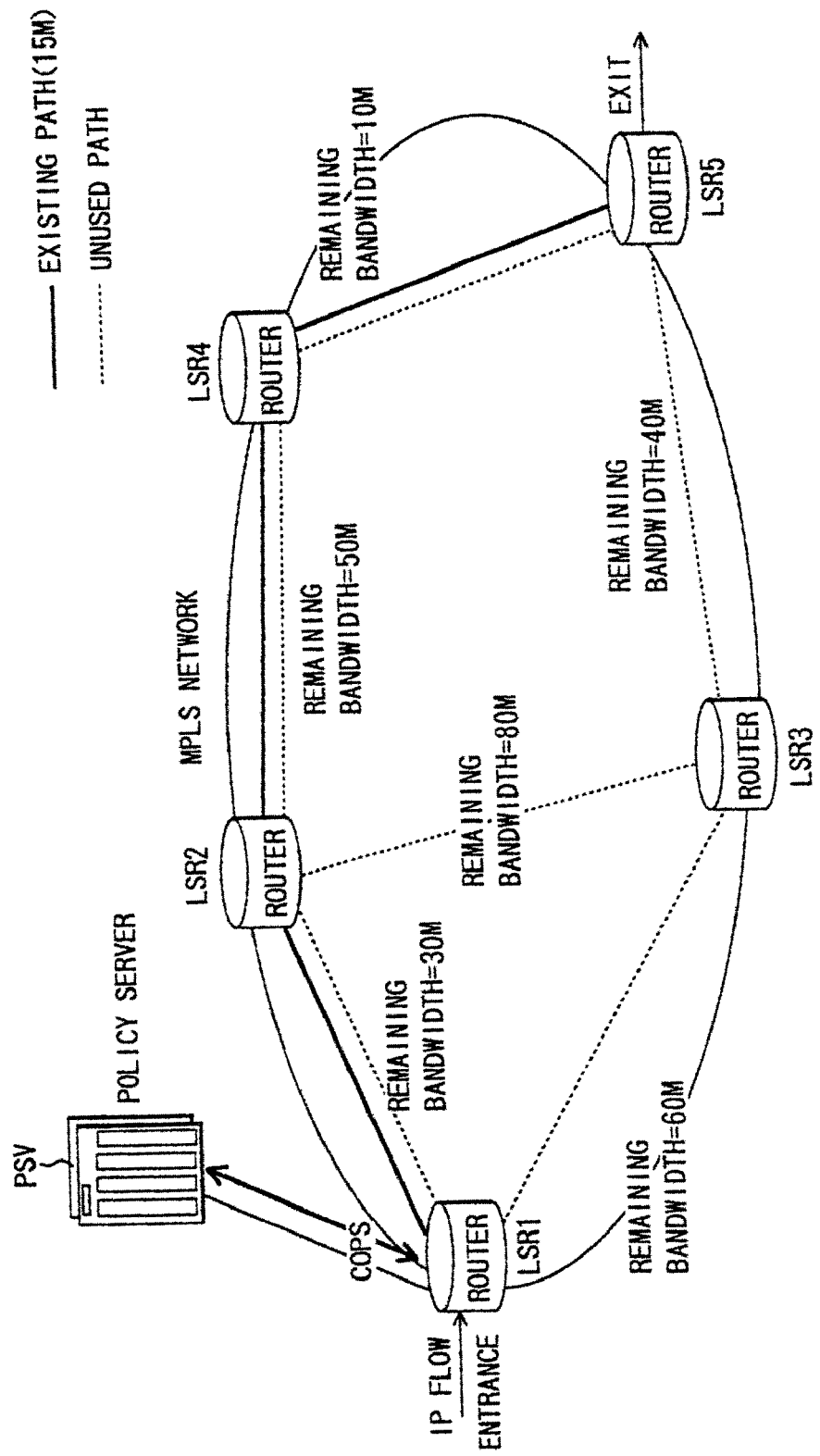
FIG. 4 is a block diagram showing the first specific configuration of a label switch network.

FIG. 4 illustrates the first specific configuration example of the label network system that has the abovementioned basic configuration.

With reference to FIG. 4, an MPLS network as a label switch network (a label network) is comprised of a policy server PSV and a plurality of label switching routers from LSR1 to LSR5 in this system. The plurality of label switching routers LSR1 to LSR6 as network apparatus constitute the corresponding nodes from ND1 to ND5 as shown in FIG. 2.

The policy server PSV is connected to the router LSR1 disposed at the ingress of the MPLS network by a physical line (physical link) and receives status information and transmits set-up instructions to them in compliance with the routers from LSR1 to LSR5 and the COPS policy control protocol. The router LSR1 disposed at the ingress of the network and the router LSR5 disposed at the egress of the network are connected through the intermediate (core) routers, LSR2, LSR3 and LSR4, by a physical line (physical link). The ingress router LSR1 and the egress router LSR5 are sometimes referred to as edge routers and are connected to other IP networks (illustrations omitted), respectively. The ingress and egress routers may also be referred to ingress and egress routers.

Figure 3:
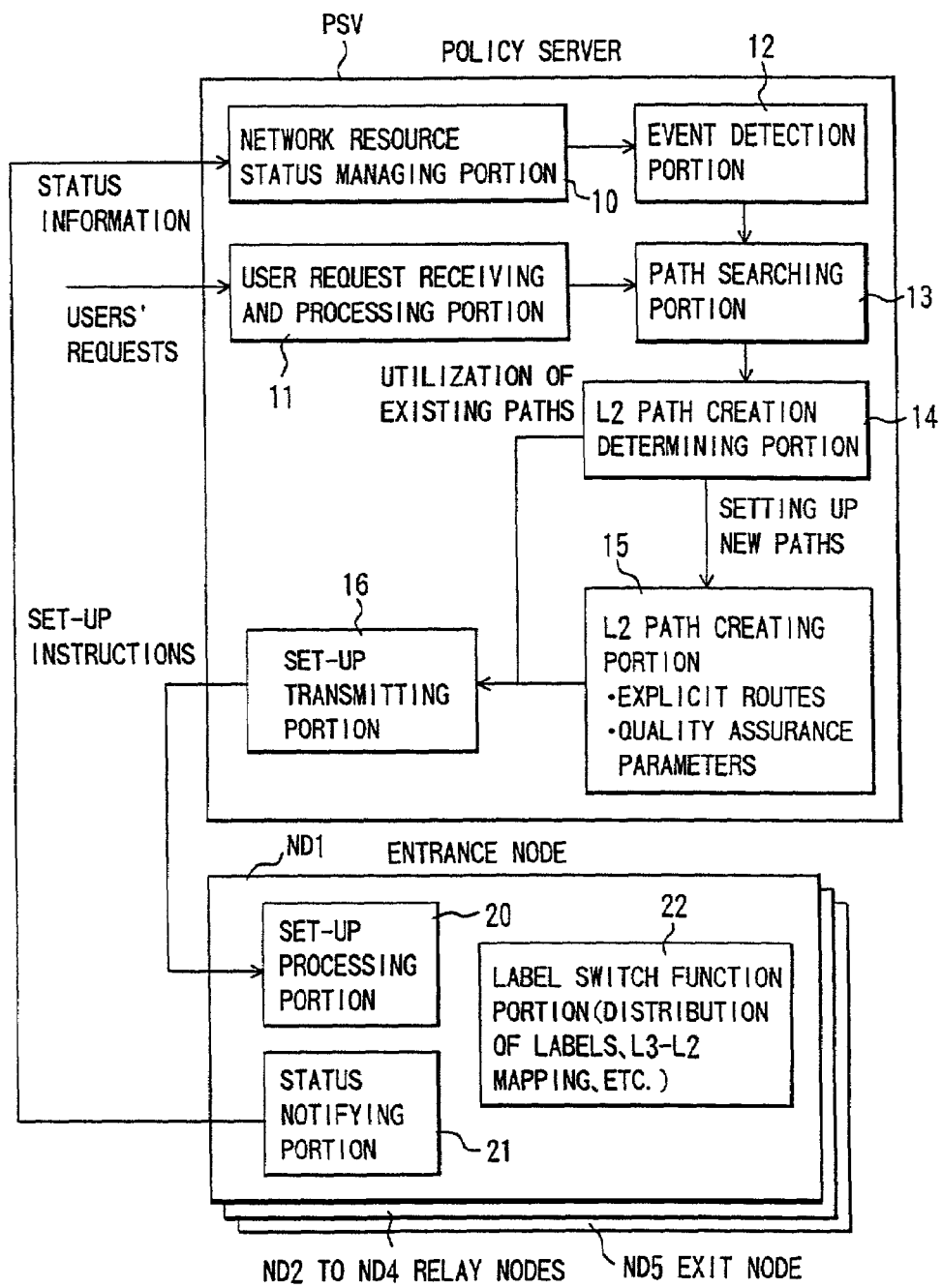
FIG. 3 is a block diagram showing an exemplary detailed configuration of the policy server and a basic configuration of the nodes in FIG. 2.

The policy server PSV and routers from LSR1 to LSR5 in this system have the same configurations, respectively, as the policy server PSV and the nodes from ND1 to ND5 whose basic configuration is shown in FIG. 3. However, a counterpart of a label switch function portion 22 composing the nodes from ND1 to ND5 is referred to as an MPLS function portion 22 in the routers from LSR1 to LSR5.

The policy server PSV determines aggregates of IP flows and explicit routes spontaneously in accordance with requests from the managers and the routers from LSR1 to LSR5 and topology changes, and notifies the ingress router LSR1 of the determinations. The policy on what to be determined is registered in a directory server beforehand and the policy server PSV stores it in its cache memory according to need.

The ingress router LSR1 executes mapping of IP packets (L3) sent by an IP network adjacent to the MPLS network with LSPs (Label Switched Paths) of L2 paths, in accordance with the flows, and transfers the packets inside the MPLS network. The router LSR1 complies the notices of route determination (set-up instructions) sent by the policy server PSV and either set up or liberates explicit LSPs in accordance with the label distribution protocols such as CR-LDP (Constraint-based Routing-Label Distribution Protocol).

Based on the label information set in compliance with the above label distribution protocols, the intermediate routers, LSR2, LSR3 and LSR4, switch labeled IP packets at a high speed and transfer the labeled IP packets to other routers.

The egress router LSR5 deletes labels from the labeled IP packets and transfers the packets to adjacent IP networks outside the MPLS network in compliance with a routing table.

Operation Example of Instructions on Aggregates of IP Flows

Figure 5:
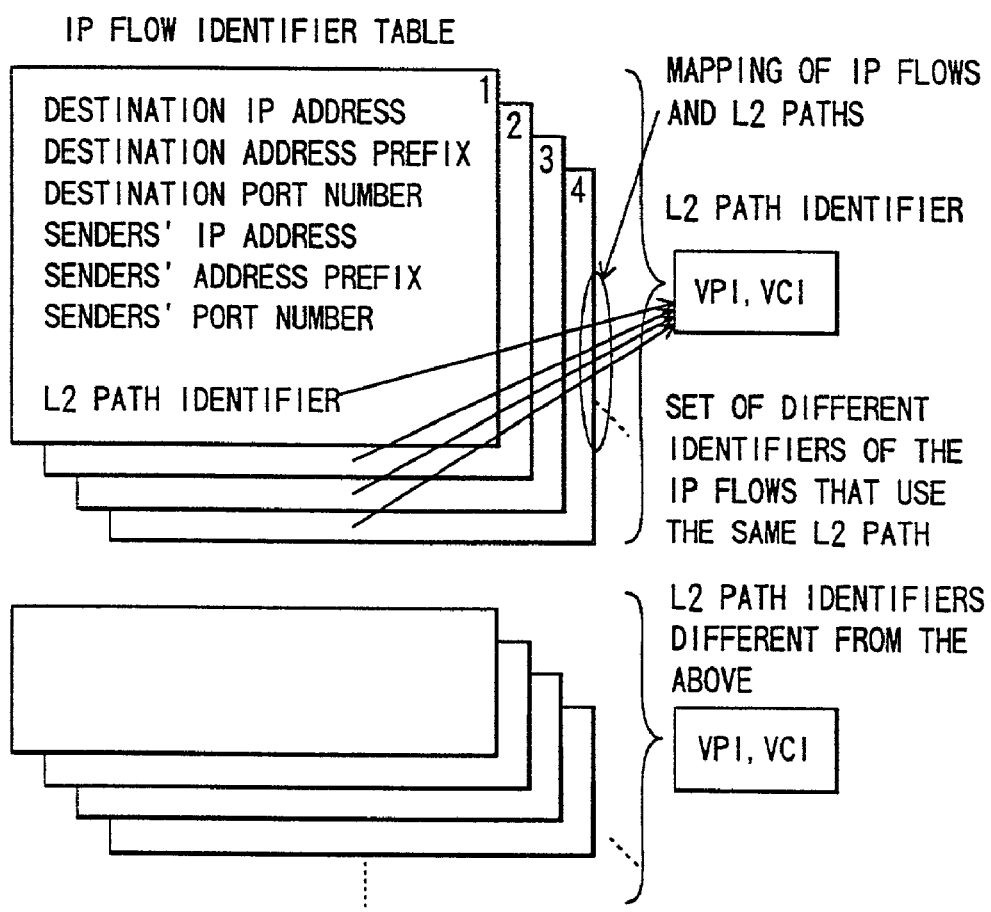
FIG. 5 is a view for explaining one example of mapping of IP flows and L2 paths.
Figure 6:
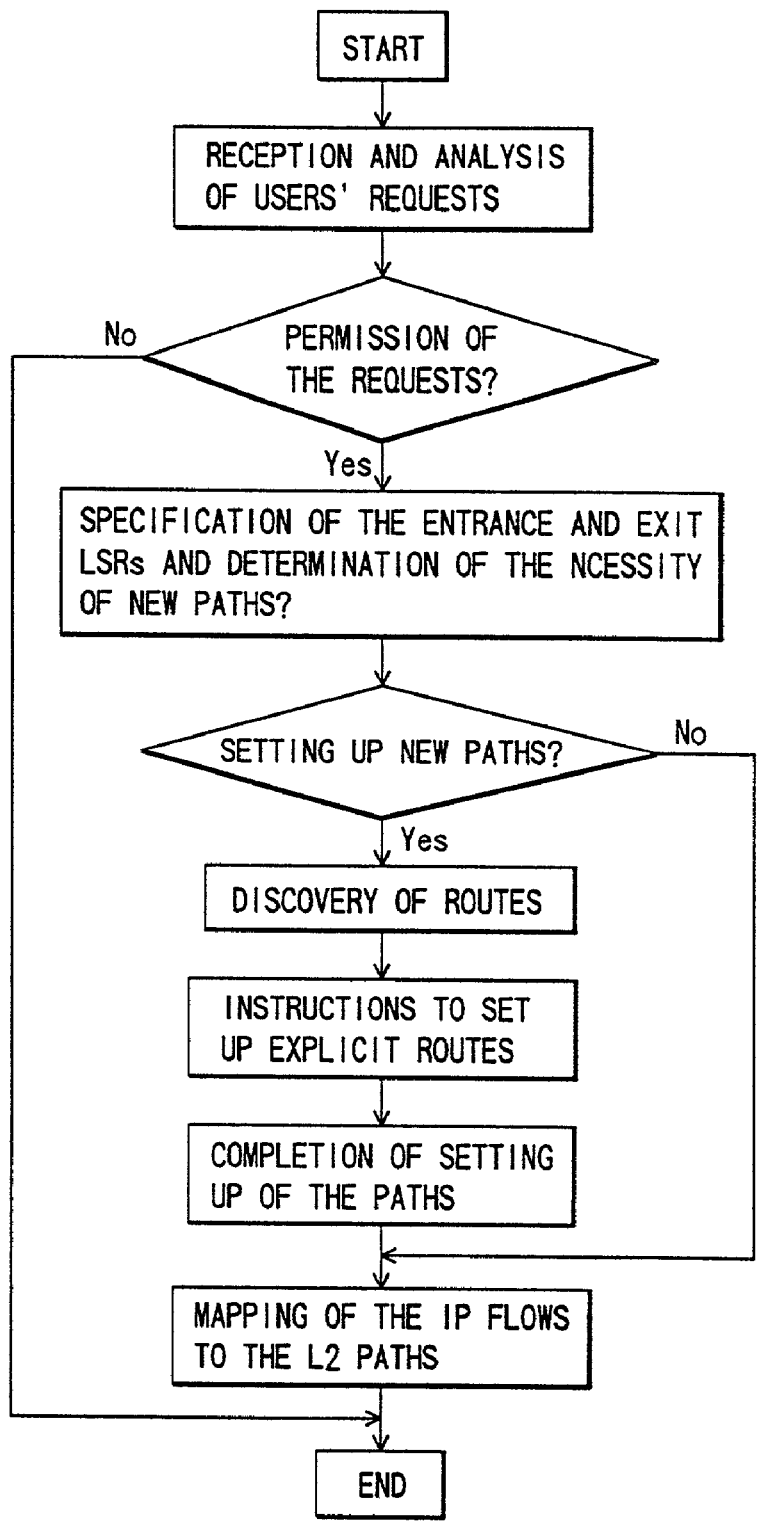
FIG. 6 is a flowchart showing operational procedures of the label switch network system shown in FIG. 4.

Next, with reference to FIG. 3, FIG. 4, FIG. 5 and FIG. 6, an operation example of the instructions on the aggregates of the IP flows in the label switch network system employing the first configuration will be explained. FIG. 5 is a view for explaining a method of mapping the IP flows and the L2 paths. Also, FIG. 6 is a flowchart of the instructions on the aggregates of the IP flows.

An MPLS network comprising routers LSRs and a policy server PSV, shown in FIG. 4 is raised as an example. Here, it is assumed that a user of this network notifies the policy server PSV of his request for starting IP transmission (IP flows) that requires a 20 Mbps bandwidth. As an example, this request is designed to assure the transmission line (bandwidth) for the purpose of transmitting dynamic images.

It does not matter whether this request is sent from a user terminal in the MPLS network managed by the policy server PSV or other networks that are not managed by the policy server PSV. Besides the users' requests, if topology of the networks outside of the MPLS network changes and the policy server is notified of status changes (status information), such as an influx of new IP flows into the MPLS network, by the routers LSRs, status changes can also trigger a sequence of the operation.

Procedure 11: The policy server PSV receives users' requests at the user request receiving and processing portion 11. If they are addressed to only one host, they are assumed to contain information on destination IP addresses and senders' (send side) IP addresses. If the requests are addressed to a plurality of hosts (or they are sent from a plurality of hosts) belonging to the same subnet, destination IP addresses and senders' IP addresses equal network addresses. In either case, the same procedures will apply.

The addresses are not necessarily those of the ends (terminals), and they can be those of the intermediate points. In this case, since only partial paths are needed to set and a path search range is also partial, there is an advantage in that a process amount is small. On the other hand, since the search range is small, it is a slightly disadvantageous substitute in view of its functions.

Procedure 12: It is assumed that users' requests contain transmission quality explicitly required. The transmission quality means bandwidths, delays, delay deviations and a waste ratio. Here, a user is assumed to request that a 20 Mbps bandwidth be assured. If the users' requests do not contain a explicit transmission quality, the policy server PSV can determine an appropriate transmission quality judging from the address information contained in the requests or IP packets and the application information using IP communications, however the quality desired by users cannot always be obtained.

Also, even though user requests are not available, when changes of the status of the network, for instance, addition of new entries to the routing table, are detected by the event detection portion 12 through the network resource status managing portion 10, setting up L2 paths corresponding to an entry can be regarded as users' requests and trigger a sequence of the operations.

Procedure 13: The policy server PSV has a function of making IP flows discover the ingress router LSR1 and the egress router LSR5 of the MPLS network, using destination IP addresses and senders' IP addresses. This function can also be decided based on the topology routing information collected by the policy server by the use of IP routing protocols such as OSPF (Open Shortest Path First) or BGP (Border Gateway Protocol) beforehand, or collected routing tables of the routers. Otherwise, the same information as actual topology can be given to the policy server PSV beforehand.

When the routing protocols are used, the policy server PSV needs to support routing protocols. This is the best method, for it collects different information and the amount of information is small.

Since collecting routing tables makes it hard to handle different information and makes it necessary to collect information for every router, this method has to process a large amount of information. However, this method can be used as a substitute method, too. A method of giving routing information to the policy server PSV beforehand cannot respond to dynamic changes of the network topology unlike the above two methods, but need not collect any kind of information at all. Therefore, it is the easiest method and can be used as a substitute.

Procedure 14: Each of the routers from LSR1 to LSR5 has a unit for notifying the policy server PSV of the utilization conditions of the links (physical lines) and the conditions of the resource reservation by users through the use of the protocols including SNMP (Simple Network Management Protocol) The policy server PSV has a function of collecting the status of the MPLS network links notified by each router LSR and managing information on it. In this operation example, the policy server PSV stores all the bandwidths in which it instructed the routers LSRs to set up paths, whereby the bandwidth in each link can be obtained and eventually the remaining bandwidths among each router LSR can be obtained.

Procedure 15: The policy server PSV has a user request receiving and processing portion 11 to determine whether it accepts users' requests or not on the basis of the address information or users' information contained in such requests. In this operation example, the policy server PSV determines whether it will accept the users' requests or not. If it does not reject the requests and processes them, the L2 paths creation determining portion 14 determines whether a new path will be set up or not.

Procedure 16: When an existing path (a path that is already set in a status of call) is found between the ingress router SR1 and the egress router LSR5 and the path can transmit IP traffic that the users request, a set-up transmitting portion 16 of the policy server PSV can instruct the ingress router LSR1 to transmit the IP flows that the users request through the existing path.

However, if the existing path cannot meet the transmission quality as the users requested or a mixture of traffic exerts a bad influence on the existing traffic, the existing path need not be used and a new path can be set up. In this operation example, the policy server PSV determines that the existing path with a 15 Mbps bandwidth cannot meet the users' requests and starts setting up a new path.

Procedure 17: A route leading from the ingress router LSR1 to the egress router LSR5 that can meet users' requests is searched by means of Dijkstra's algorithms based on the status of topology, routing and links. Other path searching algorithm and a search method by means of traceroute can also be used.

The traceroute search method has an advantage of searching for a path without topology information or routing tables, however it is time consuming and all the routers need to support the traceroute. Accordingly, the method can be used as a trade-off substitute of Dijkstra's algorithm.

In this operation example, through the use of Dijkstra's algorithm, a path searching portion 13 can discover (detect) a path leading from LSR1 to LSR5 via LSR3 (LSR1→LSR3→LSR5) and that meets the users' requests.

In terms of details of Dijkstra's algorithm, refer to: Dimitri Bertsekas, et al., Data Networks, PRENTICE-HALL, 1987. Also, in terms of details of traceroute, refer to: G. Kessler, et al., RFC2151, A primer on Internet and TCP/IP Tools and Utilities, IETF, 1997.

Procedure 18: The policy server PSV instructs the ingress router LSR1 to transfer a path set-up instruction complying with the protocols such as CR-LDP or RSVP from the ingress to the egress of the MPLS network for the purpose of providing the discovered route expressly and setting up L2 paths containing the quality assurance parameters that meet the users' requests. In this operation example, based on the COPS protocol, the policy server instructs the ingress router LSR1 to set up a path that has a 20 Mbps bandwidth and goes from LSR1 to LSR5 via LSR3 (LSR1→LSR3→LSR5).

Procedure 19: The ingress router LSR1 has a function (a set-up processing portion 20, and an MPLS function portion 22) of setting up an L2 path heading for the egress router LSR5 by using the use of the protocols for setting up explicit paths such as CR-LDP or RSVP when it receives a set-up instruction from the policy server PSV.

Procedure 20: The path set-up instruction given by the ingress router LSR1 is employed for setting up a path at the intermediate router LSR3 and transmitted to the egress router LSR5 sequentially, following the route provided in the instruction.

Procedure 21: After confirming the formation of an L2 path, the policy server PSV sends an instruction to the routers LSRs that the L2 path should execute mapping of the IP flows requested by the users. The identifiers of the IP flows include IP header information such as destination and senders' IP addresses, destination and senders' port numbers and classes of protocols, or payload information.

The identifiers can identify the IP flows one on one. When one identifier specifies a plurality of flows, identifiers using a wild card can specify a plurality of IP flows including the IP flows whose network address uses IP address masks. Both of these can be used as a substitute on an equal basis.

Procedure 22: Transferring IP packets' requires a process called "mapping" that relates an entry identifying IP flows and an L2 path to be transferred. For selecting an L2 path that carry an arbitrary IP flow, for example, it is required to provide a IP flow identifying table TBL (See FIG. 5) that has entries identifying IP flows uniquely and each entry has a pointer relating the L2 path carrying the IP flow uniquely.

The above relating process is called mapping, whereby it is possible to determine which L2 path will carry the IP flows that hit the entries from the matching relation. If a plurality of IP flows are transferred by the same L2 path, a pointer of each IP flow entry designates the same L2 path. The same applies to other L2 paths.

The operation of each router LSR retrieves the above IP flow identifying table TBL to examine whether the IP packets can hit the entries identifying them or not when the IP packets reach the routers. When the entries are hit, the entries contain an L2 path identifier, L2ID, which determines an L2 path to which IP packets should be transferred.

When mapping of IP flows (L3) and L2 paths is completed, the IP traffic the users requested can finally be transmitted in a quality class the users request.

Second Specific Configuration and Operation of Label Switch Network System

Figure 7:
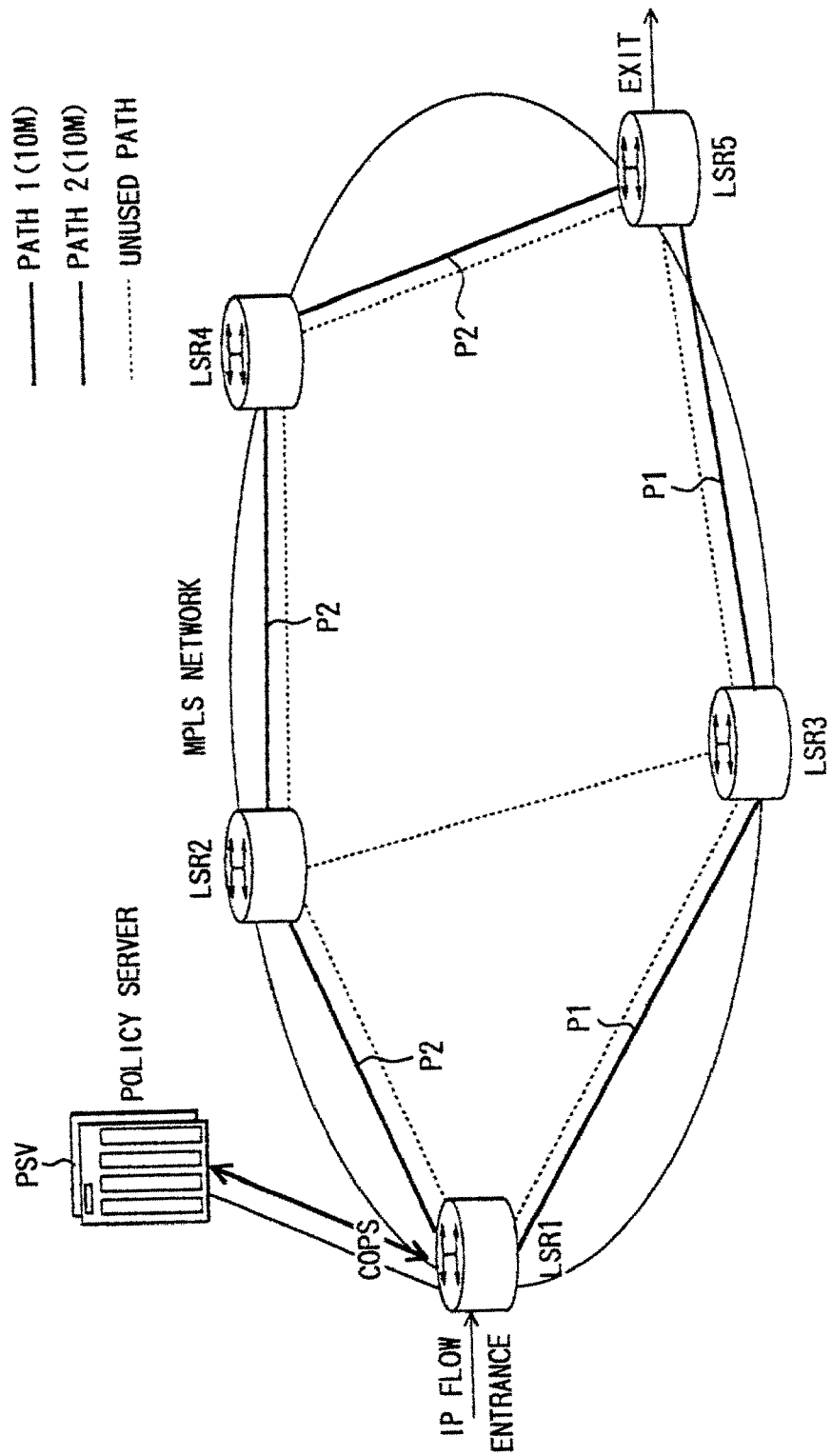
FIG. 7 is a block diagram showing a second specific configuration of a label switch network system.
Figure 8:
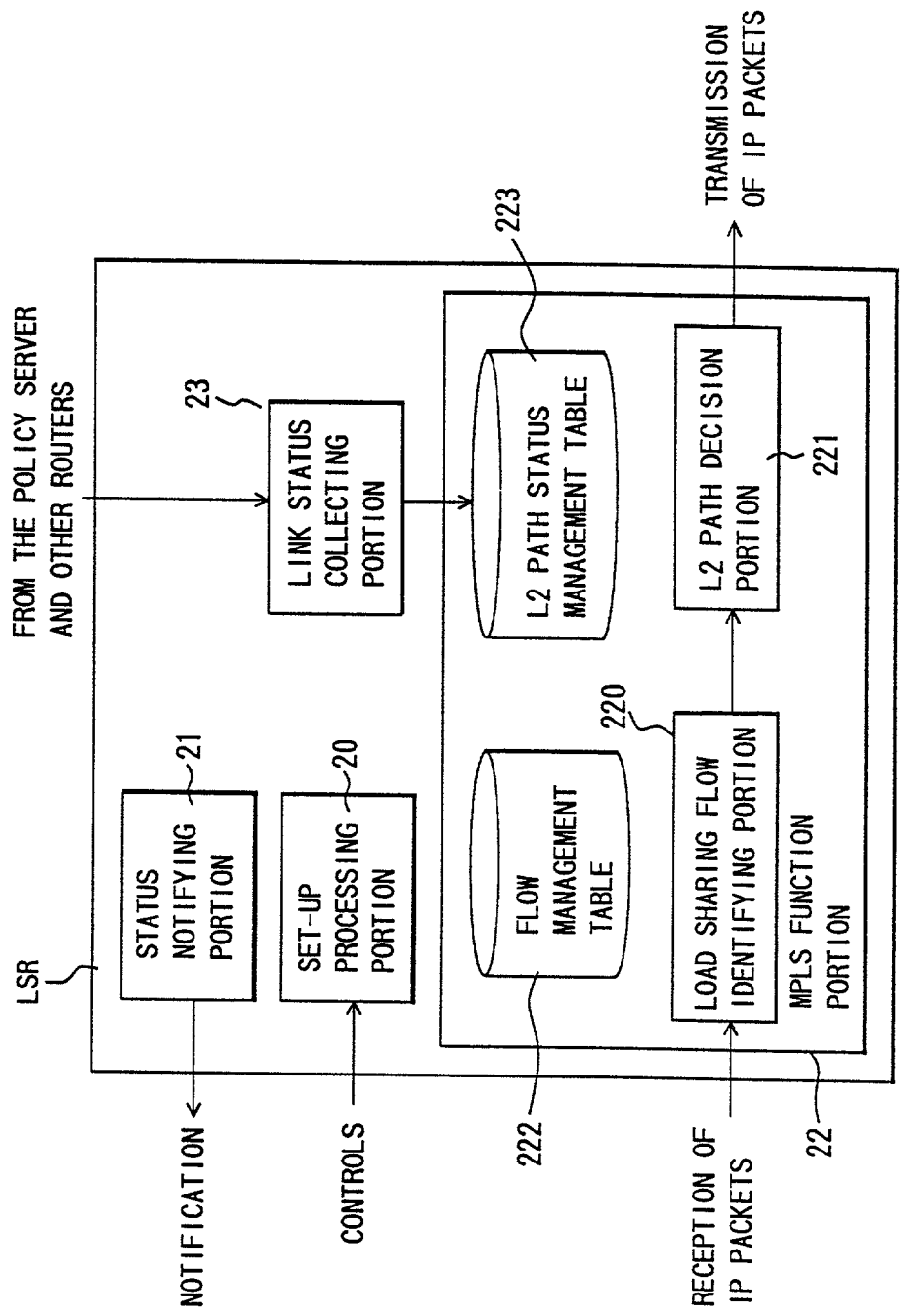
FIG. 8 is a block diagram showing an exemplary detailed configuration of the nodes in the label switch network system shown in FIG. 7.

FIG. 7 illustrates the second specific configuration of the label switch network system that has a basic configuration shown in FIG. 2 and FIG. 3. FIG. 8 shows a configuration example of each router illustrated in FIG. 7.

With reference to FIG. 7 and FIG. 8, an MPLS network as a label switch network is formed of a policy server PSV and a plurality of label switching routers from LSR1 to LSR5 in this system. As network equipment a plurality of label switching routers from LSR1 to LSR5 compose corresponding nodes from ND1 to ND5 shown in FIG. 2.

The policy server PSV is connected to the router LSR1 disposed at the ingress of the MPLS network by a physical line (a physical link) and receives status information from the routers from LSR1 to LSR5 and transmits set-up instructions to them in compliance with the policy control protocol, COPS. The router LSR1 disposed at the ingress of the network and the router LSR5 disposed at the egress of the network are connected by way of the intermediate routers, LSR2, LSR3 and LSR4, and a physical line (a physical link). The ingress router LSR1 and the egress router LSR5 are connected to other IP networks (illustrations omitted), respectively.

The policy server PSV in this system has the same constituents as the policy server PSV whose basic configuration is shown in FIG. 3. The routers from LSR1 to LSR5 have the same constituents as the nodes from ND1 to ND5, such as a set-up processing portion 20, a status notifying portion 21 and a label switch function portion 22 (It is referred to as an MPLS function portion 22 in this system.) and in addition to these portions, these routers have a link status collecting portion 23. The MPLS function portion 22 of the routers from LSR1 to LSR5 is composed of a load sharing flow identifying portion 220, an L2 path decision portion 221, a flow management table 222 and a L2 path status management table 223.

Operation Example of Traffic Load Sharing or Load Balancing

Figure 9:
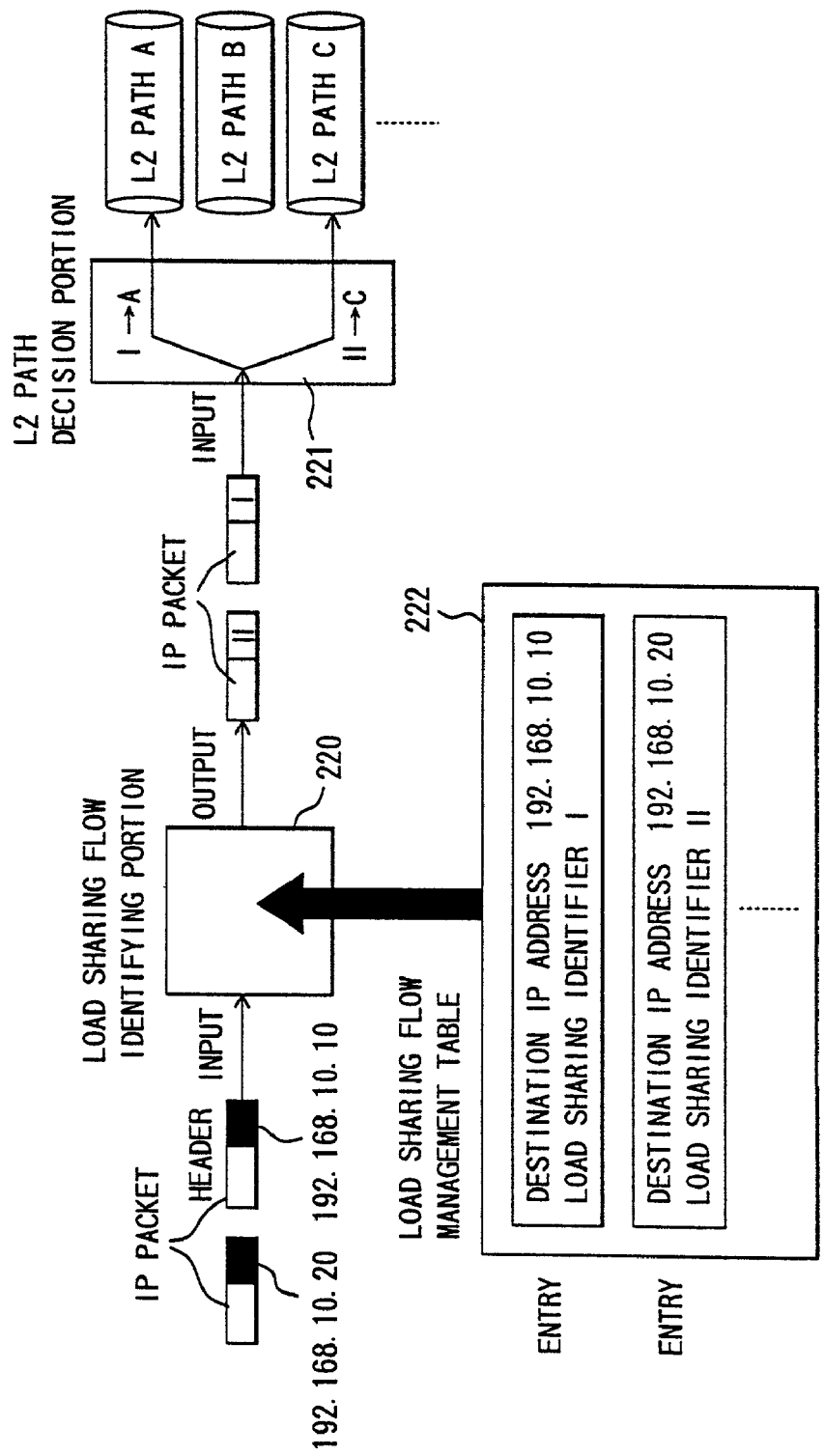
FIG. 9 is a view for explaining an operation example of load sharing (load balancing)

Next, with reference to FIG. 3, FIG. 7, FIG. 8 and FIG. 9, an explanation will be given as to the operation example of the traffic load sharing in the label switch network system that has the second configuration described above. FIG. 9 illustrates a method of controlling load sharing (load balancing).

An MPLS network composed of routers LSRs and a policy server PSV, shown in FIG. 7, is used as an example. Here, it is assumed that users of this network notify the policy server PSV of a request to start new IP transmission (IP flows) in an assured quality. To realize load sharing by the use of intensive controls it is premised that the MPLS network has a plurality of routes leading from the ingress router LSR1 to the egress router LSR5.

Procedure 31: The policy server PSV receives, analyzes and accepts the users' requests and determines whether a L2 path should be newly set up or not, by the same process as the abovementioned procedures from 11 to 16 in the first operation example.

Procedure 32: With respect to the IP flows that can meet the user's requests, the policy server PSV discovers the IP flows by utilizing the route search methods such as Dikjstra's algorithm based on the topology status which has the most abundant resources, such as bandwidths and delays, out of the routes leading from the ingress router LSR1 to the egress router LSR5, routing status, and link status.

The policy server PSV explicitly provides the route and instructs the ingress router LSR1 to set up an L2 path containing a quality assurance parameter that meets the users' requests, whereby enabling the selection of paths that can avoid links with few resources, high utilization, and high load, as a result of this, it can be achieved to have the load to be shared without concentrating in a single link.

Procedure 33: If a plurality of IP flows go from the ingress router LSR1 to the egress router LSR5, a plurality of paths are set up, and load can be shared among a plurality of paths as a substitute of the first route selection method. For instance, as two different routes, P1: LSR1→LSR3→LSR5 and P2: LSR1→LSR2→LSR4→LSR5 are discovered.

The policy server PSV compares these routes on the basis of the utilization conditions of the resources collected and managed by the policy server PSV and based on the utilization conditions it dynamically selects one route that has the more abundant resources and instructs the ingress router LSR1 to set up a route following this route.

Procedure 34: If a plurality of IP flows go from the ingress router LSR1 to the egress router LSR5, as a substitute of the second route selection method, as two different routes that satisfy the users' requests, P1:LSR1→LSR3→LSR5 and P2: LSR1→LSR2→LSR4→LSR5 are discovered.

Next, the policy server instructs the ingress router LSR1 to set up all of these routes as L2 paths and selects one L2 path out of a plurality of L2 paths that can be used for transmission so as to prevent traffic congestion in one path whenever the ingress router LSR1 transmits IP packets contained in the IP flows requested by the users. Accordingly, IP flows divided into packets can be sent and load can be distributed.

LSR1 can collect the utilization conditions of every route for itself so as to use them as a guideline for selecting an L2 path appropriate for transmission. Whereas in the abovementioned second route selection method the policy server PSV gives an instruction to the router LSR1, in this method, LSR1 makes a decision by itself without the instructions of the policy server PSV. Consequently few control delays are observed and the policy server PSV has alleviated load.

In the abovementioned second operation example, the router LSR1 identifies the packets that need load sharing and those that do not, by referring to the flow management table 222 when LSR1 receives IP packets. If the policy server PSV determines that the packets need load sharing, it selects an L2 path with the lightest load out of a plurality of L2 paths used for transmitting the IP packets, by referring to the table managing L2 paths' status 223, and transfers the IP packets through the L2 path. Thus, load sharing can be realized.

The IP traffic requested by the users is finally transferred from the MPLS network to adjacent IP networks in a quality the users requested without causing any congestion of the load in the MPLS network.

With reference to FIG. 9, "a load sharing identifier" tag is newly put on the IP packets as the packets subjected to load sharing, which hit the entries of the load sharing distribution flow management table 222 of the load sharing flow identifying portion 220, out of the IP packets input to the routers LSR. In this example, it is assumed that the IP packets with two different addresses arrive and tags "A", and "B" are put on them by the load sharing flow identifying portion 220.

The tagged packets are next sent to the L2 path decision portion 221 and the L2 paths through which they will be transmitted are selected. The L2 path decision portion 221 is controlled to work with a mechanism in that the packets which already have the tags "A" and "B" may choose appropriate paths, checking the traffic congestion of the L2 paths.

In this case, if the IP packet with the tag "A" is decided to be transmitted through an L2 path "A" first and the packet to be sent right after A is transmitted through the same path "A", a path "C" will not be utilized at all and so traffic congestion will arise in the path "A". Therefore, the L2 path decision portion 221 determines that the IP packet with the tag "B" will next select the path "C", a path different from the path "A", and will be transferred through the path "C". Thus, load sharing is achieved.

Third Specific Configuration and Operation of Label Switch Network System

Figure 10:
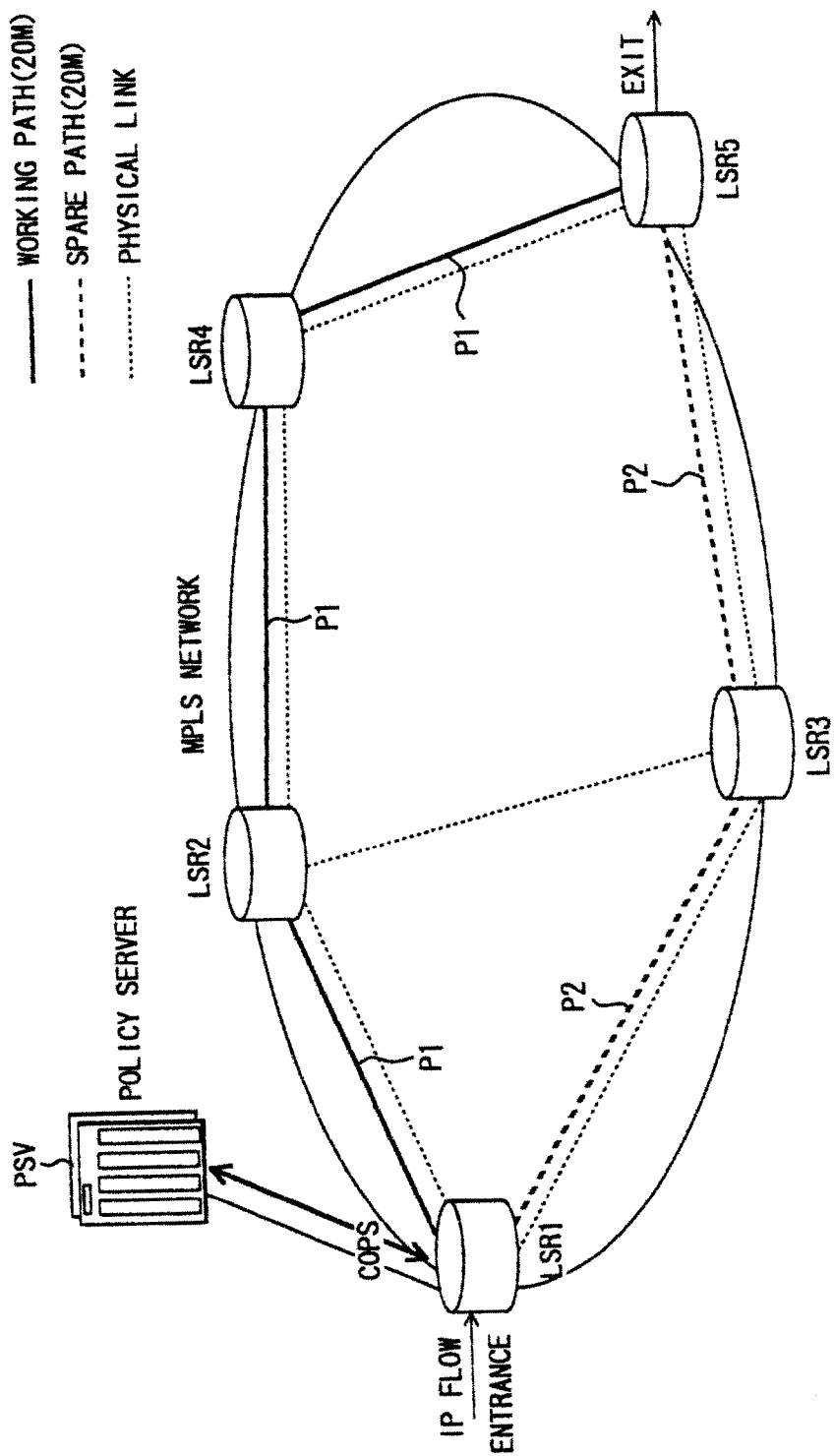
FIG. 10 is a block diagram showing a third specific configuration of a label switch network system.
Figure 11:
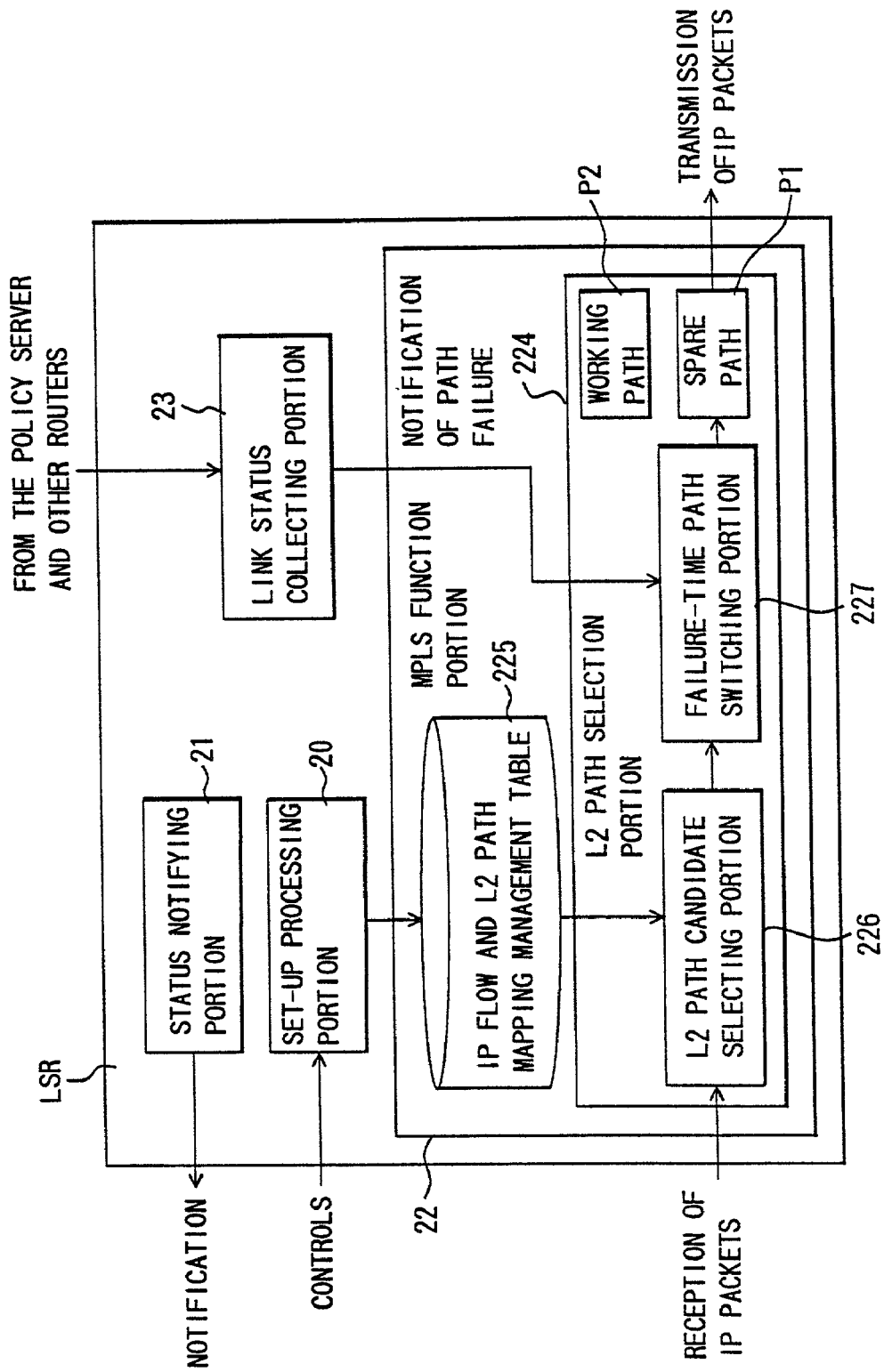
FIG. 11 is a block diagram showing an exemplary detailed configuration of the nodes in the label switch network system shown in FIG. 10.

FIG. 10 illustrates the third specific configuration of the label switch network system that has a basic configuration shown in FIGS. 2 and 3. FIG. 11 shows a configuration example of each router illustrated in FIG. 10.

With reference to FIGS. 10 and 11, an MPLS network as a label switch network is formed of a policy server PSV and a plurality of label switching routers from LSR1 to LSR5 in this system. A plurality of label switching routers from LSR1 to LSR5 compose corresponding nodes from ND1 to ND5 shown in FIG. 2, as network equipment.

The policy server PSV is connected to the router LSR1 disposed at the ingress of the MPLS network by a physical line (a physical link) and receives status information from the routers from LSR1 to LSR5 and transmits a set-up instruction in compliance with the policy control protocol, COPS. The router LSR1 disposed at the ingress of the network and the router LSR5 disposed at the egress of the network are connected by the intermediate routers, LSR2, LSR3 and LSR4, and a physical line (a physical link). The ingress router LSR1 and the egress router LSR5 are connected to other IP networks (illustration omitted) respectively.

The policy server PSV in this system has the same constituents as the policy server PSV whose basic configuration is shown in FIG. 3., The routers from LSR1 to LSR5 have the same constituents as the nodes from ND1 to ND5, such as a set-up processing portion 20, a status notifying portion 21 and a label switch function portion 22 (It is referred to as an MPLS function portion 22 in this system) and apart from them, these routers have a link status collecting portion 23.

The MPLS function portion 22 of the routers from LSR1 to LSR5 is composed of an L2 path selection portion 224, and a IP flow and L2 path mapping management table 225. The L2 path selection portion 224 has an L2 path candidate selecting portion 226 and a failure-time path switching portion 227.

First Operation Example of Redundant Links

Next, with reference to FIGS. 3, 10 and 11, an explanation will be given as to the first operation example of redundant links in the label switch network system that has the third configuration described above.

An MPLS network composed of routers LSRs and a policy server PSV, shown in FIG. 10, is used as an example. Here, it is assumed that users of this network notify the policy server PSV of a request to start new IP transmission (IP flows) in an assured quality. To realize redundant links, it is premised that the MPLS network has a plurality of routes leading from the ingress router LSR1 to the egress router LSR5.

Procedure 41: The policy server PSV receives, analyzes and accepts users' requests and determines whether setting up an L2 path is required or not, by the same process as the abovementioned procedures from 11 to 16 in the first operation example.

Procedure 42: The policy server PSV discovers 2 or more arbitrary routes (2 routes in this example) leading from the ingress router LSR1 to the egress router LSR5 that can meet the users' requests, by the use of the above route search methods such as Dijkstra's algorithm based on the topology status, routing status and link status.

The policy server PSV provides a plurality of routes explicitly and instructs the ingress router LSR1 to set up L2 paths containing a quality assurance parameter that meets the users' requests. The policy server PSV also gives an instruction that some of these L2 paths are normally utilized as working paths and the remaining paths are used as spare paths, respectively, which serve as backup paths (paths in a hot stand-by status) when failures impede the use of the working paths, and specifies more than one IP flows that use L2 paths.

Here, the policy server PSV instructs the ingress router LSR1 to set up 2 paths (P1: LSR1→LSR2→LSR4→LSR5 and P2: LSR1→LSR3→LSR5). After the two paths are established, respectively, the policy server PSV instructs the ingress router LSR1 to use P1: LSR1→LSR2→LSR4→LSR5 as a working path and P2: LSR1→LSR3→LSR5 as a spare path.

Procedure 43: If LSR1 becomes aware that a failure has made it impossible to use the working path, by a status notice from the policy server PSV or any of the other routers from LSR2 to LSR5, LSR1 will automatically use the spare path without waiting for an instruction from the policy server PSV to switch from the working path to the spare path.

If, for instance, shown in FIG. 11, a link status collecting portion 23 of LSR1 detects a failure of the working path, it will notify an L2 path selection portion 224 of the failure. A failure-time path switching portion 227 determines use of the spare path P2 out of the working and spare path candidates for transmitting the IP packets and transmits IP packets through the spare path P2.

Second Operation Example of Redundant Links

Next, with reference to FIGS. 3, 10 and 11, an explanation will be given as to the second operation example of redundant links in the label switch network system that has the third configuration described above.

An MPLS network composed of routers from LSR1 to LSR5 and a policy server PSV is used in this operation example like the first operation example of the redundant links mentioned above. Here, it is assumed that users of this network notify the policy server PSV of a request to start a new IP transmission (IP flows) in an assured quality. To realize the redundant links, it is premised that the MPLS network has a plurality of routes leading from the ingress router LSR1 to the egress router LSR5.

Whereas in the first operation example of the redundant links mentioned above, the spare path was used only at the time of failures of the working path, here in the second operation example of the redundant links, the spare path and the working path are concurrently used for the purpose of promoting efficiency in redundant links.

Procedure 51: The policy server PSV receives, analyzes and accepts users' requests and determines whether or not setting of a new L2 path is required, by following the same process as the abovementioned procedures from 11 to 16 in the first operation example of the label switch network system.

Procedure 52: The policy server PSV discovers 2 or more arbitrary routes (2 routes in this example) leading from the ingress router LSR1 to the egress router LSR5 that can meet the users' requests, by the use of the above route search methods such as Dijkstra's algorithm based on the topology status, routing status and link status.

The policy server PSV provides explicitly a plurality of routes and instructs the ingress router LSR1 to set up L2 paths containing a quality assurance parameter that meets the users' requests. The policy server PSV also gives an instruction that some of the L2 paths are normally used as working paths and the remaining paths are used as spare paths, respectively, which serve as backup paths (paths in a hot stand-by status) when failures impede the use of the working paths and specifies more than one IP flows that use L2 paths.

Here, the policy server PSV instructs the ingress router LSR1 to set up 2 paths (P1: LSR1→LSR2→LSR4→LSR5 and P2: LSR1→LSR3→LSR5). After the two paths are established, respectively, the policy server PSV instructs the ingress router LSR1 to use P1: LSR1→LSR2→LSR4→LSR5 as a working path and P2: LSR1→LSR3→LSR5 as a spare path.

Procedure 53: The policy server PSV instructs the ingress router LSR1 to select and assign IP flows appropriately to the L2 paths at the same time so that the spare path may be utilized for transmitting other IP flows when the working path is being used. Basically these IP flows are other IP flows sent to the same egress router LSR5 and arbitrary IP flows can be selected, which satisfy the communications quality that is conventionally required to be satisfied. If the IP flows can reach the ultimate destinations and satisfy the communications quality that is conventionally required to be satisfied, the egress router can be different.

Procedure 54: The policy server PSV instructs the ingress router LSR1 to switch the spare path to another L2 path for the purpose of transmitting the IP flows and switch the working path to the spare path to transmit the IP flows that was sent through the working path, if a failure arises in the working path.

More detailed explanations are given here. It is assumed that 3 paths, i.e., a working path, a spare path and a best effort path are already set. It is also assumed that out of the above three paths, the working path and spare path have a guaranteed 20 Mbps bandwidth, but that the best effort path has no guaranteed bandwidth. IP flows A and B exist and each router is set to work as follows. At the time of a line failure, the spare path transmits the IP flow A. If no failure arises, the spare path transmits the IP flow B, but at the time of a failure the best effort path transmits the IP flow B.

If no failures arise, both of the IP flows A and B can be sent through the guaranteed 20 Mbps bandwidth, but once a failure arises, the IP flow A is switched to be transferred to the spare path in accordance with the control policy predetermined and the IP flow B is switched to be transferred through the best effort path. It is possible to provide the IP flow A with a spare bandwidth against failures and to provide the IP flow B with an assured bandwidth as long as no failure arises.

Procedure 55: If the router LSR1 is notified of the fact that the working path cannot be used due to a failure by the policy server PSV or any of the other routers from LSR2 to LSR5, LSR1 automatically uses the spare path without waiting for a path switch instruction from working path to spare path by the policy server PSV.

If for instance, shown in FIG. 11, the link status collecting portion 23 of LSR1 detects a failure in the working path, it notifies the L2 path selection portion 224 of the fact. The failure-time path switching portion 227 determines that the spare path P2 will be used out of the working and spare path candidates for the IP packets and the IP packets will be transmitted through the spare path P2.

Operation Example of Extended Mapping of IP Flows and L2 Paths

Figure 12:
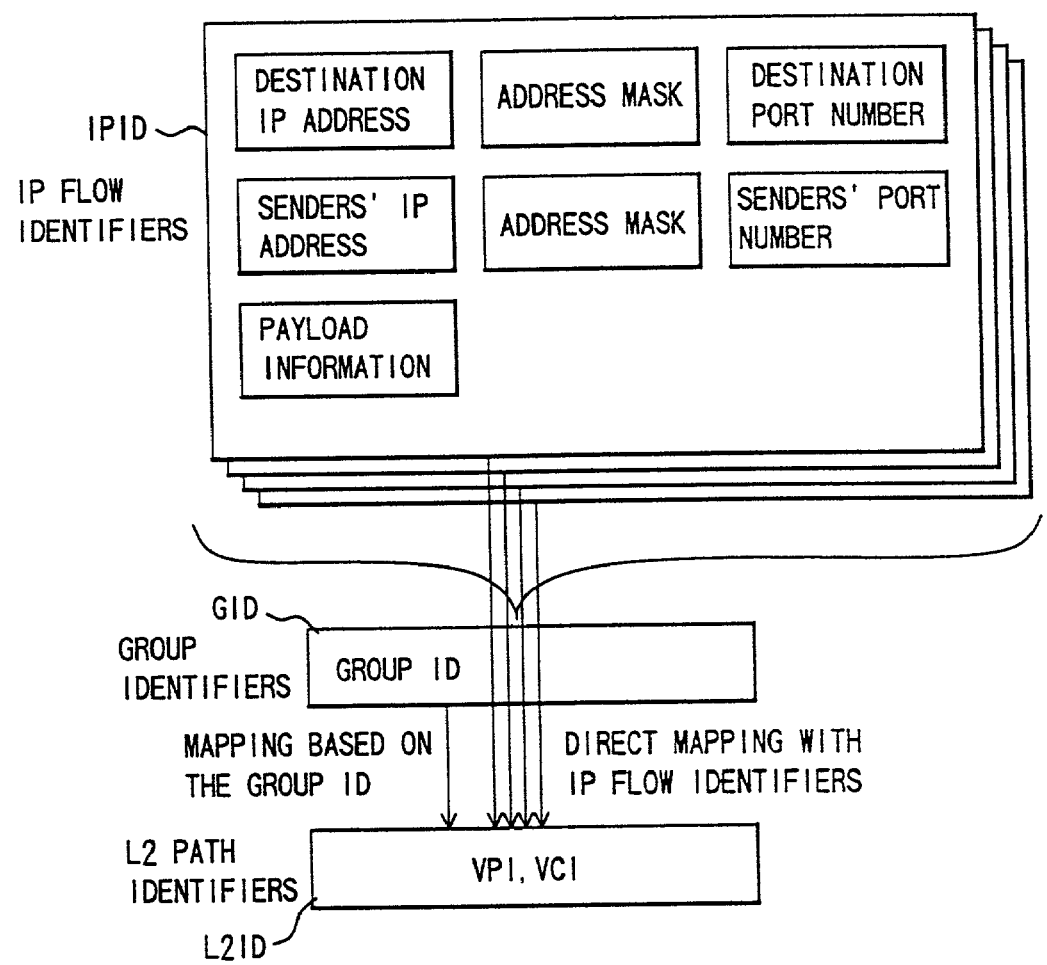
FIG. 12 is a view for explaining an operation example of extended mapping of the IP flows and L2 paths.

Next, with reference to FIGS. 3, 11 and 12, an explanation will be given as to an operation example of extended mapping of the IP flows and the L2 paths in the label switch network system that has the third configuration shown above. FIG. 12 illustrates the operation example of the extended mapping of the IP flows and the L2 paths.

In respect of the extended mapping of the IP flows and L2 paths, IP flow identifiers IPID and the L2 paths are not directly mapped, but group identifiers GID compiled from a plurality of IP flow identifiers IPID on the basis of destinations and L2 paths are mapped. In terms of redundant link L2 paths introduced against line failures, for instance, when the working path was switched to the spare path, since IP flow identifiers IPID were directly matched with the L2 paths, mapping information for every IP flow identifier IPID conventionally needed to be changed when the L2 paths were switched to other L2 paths.

On the other hand, the use of group identifiers GID enables changes in mapping of a plurality of IP flows and L2 paths at the same time only by changing the mapping of the group identifiers GID and L2 path identifiers L2ID, thus reducing processing cost and processing time in each node.

When the MPLS function portion 22 of the ingress router LSR1 selects an L2 path to transmit IP packets of the input IP flows, the L2 path candidate selecting portion 226 selects an IP flow identifier IPID having the information corresponding to input IP packet with reference to the IP flow and L2 path mapping management table 225. After group identifiers GID are discovered by a search for mapping of these IP flow identifiers IPID and group identifiers GID corresponding to IPID, corresponding L2 path identifiers L2ID are selected, based on the group identifiers GID found.

Although only a few example embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A label switch network system having a plurality of label switch nodes interconnected by network links where layer 2 paths are set up by specified routes between the plurality of label switch nodes from a network ingress to a network egress, comprising:
   an ingress node which is disposed at the network ingress of the label switch network that transfers packets corresponding to packet flows based on labels, and which selects layer 2 paths for transferring the packets with reference to the header or payload information of the packets; and
   a policy server connected to the ingress node and instructing the ingress node to set up the layer 2 paths in compliance with policy control protocols when at least one of a user makes a request or a stains change in the network arises;
   wherein the ingress node sets up the layer 2 paths between the plurality of label switch nodes from the network ingress to the network egress, based on an instruction given by the policy server.

2. The label switch network system according to claim 1, wherein the policy server comprises:
   a unit for detecting the user request and the status change in the network,
   a unit for determining, when transferring the packets in the ingress node, whether existing layer 2 pats are selected to transfer the packets or new layer 2 paths following appropriate routes are to be newly set up, and
   a unit for calculating appropriate routes for the layer 2 paths including quality assurance parameters.

3. The label switch network system according to claim 1, wherein the ingress node comprises:
   a unit for notifying the policy server of the user request or the status change in the network when the ingress node itself detects die user request or the status change in the network, or when the ingress node collects the user request or the status change in the network from any of the plurality of label switch nodes; and
   the policy server comprises:
   a unit for instructing the ingress node to set up the layer 2 paths for transferring the packets corresponding to newly generated packet flows, in response to notices sent by the ingress node.

4. The label switch network system according to claim 1, wherein each of the plurality of label switch nodes comprises:
   a unit for routing the packets, and a unit for setting up the layer 2 paths passing through routes specified by IP addresses contained in the packets; and
   the policy server comprises:
   a unit for specifying one of the plurality of label switch nodes through which a layer 2 path will pass through in accordance with the IP address corresponding to the one of the label switch nodes.

5. The label switch network system according to claim 1, wherein when a plurality of the layer 2 paths exist through which packet flows can pass, new packet flows are generated based on a user request or a detected status change in the network, and
   the policy server has a unit that responds to resource utilization conditions of each physical line as collected beforehand, by searching for routes that will keep the resource utilization conditions of each physical line balanced when adding the new packet flows, and a unit for instructing the ingress node to set up the layer 2 paths that can communicate the new packet flows generated in response to the user request or the detected status change in the network.

6. The label switch network system according to claim 1, wherein the ingress node comprises:
   a unit for collecting and managing utilization conditions of the layer 2 paths, and
   a unit for selecting from among a plurality of layer 2 paths through which certain packet flows can pass, the layer 2 paths appropriate for transferring the certain packet flows based on the utilization conditions of the plurality of the layer 2 paths.

7. The label switch network system according to claim 6, wherein she policy server detects newly generated packer flows generated in response to a user request or a status change in the network, and the policy server comprises:
   a unit for instructing the ingress node to set up a plurality of the layer 2 paths which transfer the newly generated packer flows, and
   a unit for instructing the ingress node to select the layer 2 paths appropriate for either the packets or the packet flows as a unit so that transferring he new packer flows will not cause any imbalance in the utilization conditions of the plurality of layer 2 paths with each other.

8. The label switch network system according to claim 1, wherein when a plurality of the layer 2 paths exist through which packet flows can pass, new packet flows are generated by a user request or a detected status change in the network, and the policy sewer has a unit for searching for at least two different routes for new layer 2 paths to transfer The new packet flows, for generating the new layer 2 paths for transferring the new packet flows, and for designating one of the new layer 2 paths as a working pat and the other as a spare path in accordance with resource utilization conditions of each physical line as collected beforehand, and has a unit for instructing the ingress node to switch from the working path to the spare path, based on a judgment at one of the plurality of the label switch nodes when said one of the plurality of the label switch nodes detects a failure in the working path, and
   the ingress node has a unit for switching the working path to the spare path when the ingress node itself detects a failure in the working path.

9. The label switch network system according to claim 8, wherein the policy server has a unit for instructing the ingress node to use the spare path for other traffic when the working path is normally operating, and to stop the other traffic from using the spare path and to make the spare path accommodate traffic which the working path was carrying when a failure arises in the working path.

10. The label switch network system according to claim 1, wherein one of the layer 2 paths can transfer packets corresponding to a plurality of different packer flows, and wherein the policy server and the plurality of label switch nodes each have
   a unit for defining logical groups to which a plurality of packet flows belong and group identifiers for identifying the groups thereof, and
   a unit for specifying the plurality of packer flows belonging to the group by the group identifiers when one of the layer 2 paths is switched; and
   the policy server has a unit for giving instruction to the ingress node so that packet flows and the layer 2 paths match with each other, making use of the group identifiers when one of the layer 2 paths is switched.

11. A policy server providing centralized management for a label switch network system having a plurality of label switch nodes interconnected by network links where layer 2 paths are set up by specified routes between the plurality of label switch nodes from a network ingress to a network egress, and an ingress node disposed at the network ingress of the label switch network that transfers packers corresponding to packet flows based on labels, and which selects layer 2 paths for transferring the packets with reference to the header or payload information of the packets; the policy server comprising:

a receive processing unit for detecting user requests or status changes in the network, and a path creation and transmitting unit responsive to the receive processing unit, for instructing the ingress node to set up the layer 2 paths in compliance with policy control protocols, via the plurality of label switch nodes;

wherein the ingress node sets up the layer 2 paths between the plurality of label switch nodes from the network ingress to the network egress, based on an instruction given by the policy serves.

12. The policy server of claim 11, further comprising:

a unit for determining, when transferring the packets in the ingress node, whether existing layer 2 paths are selected to transfer the packets or new layer 2 paths following appropriate routes are to be newly set up, and a unit for calculating appropriate routes for the layer 2 paths including quality assurance parameters.

13. The policy server of claim 11, wherein the ingress node notifies the policy server of the user request or the status change in the network, and
the policy server further comprising:

a unit for instructing the ingress node to set up the layer 2 paths for transferring the packets corresponding to newly generated packet flows, in response to notices sent by the ingress node.

14. The policy server of claim 11, wherein the packets are IP packets and contain IP addresses, and
the policy server comprises:

a unit for specifying one of the plurality of label switch nodes through which a layer 2 path will pass through in accordance with the IP address corresponding to the one of the label switch nodes.

15. The policy server of claim 11, wherein the packets are IP packets and a plurality of the layer 2 paths through which IP flows can pass exist, new IP flows are generated based on a user request or a detected status change in the network, and the policy server further comprises:

a unit that responds to resource utilization conditions of each physical line as collected beforehand, for searching routes that will keep the resource utilization conditions of each physical line balanced when adding the new IP flows, and a unit for instructing the ingress node to set up the layer 2 paths that can transfer the new IP flows generated in response to the user request or the detected status change in the network.

16. The policy server of claim 11, wherein the policy sewer detects newly generated packet flows generated based on a user request or a status change in the network, and the policy server further comprises:

a unit for instructing the ingress node to set up a plurality of the layer 2 paths which transfer the newly generated packet flows, and a unit for instructing the ingress node to select the layer 2 paths appropriate for either the packets or the packet flows as a unit so that transferring the new packer flows will not cause any imbalance in the utilization conditions of the plurality of layer 2 paths with each other.

17. The policy server of claim 11, wherein when a plurality of the layer 2 paths exist though which packet flows can pass, new packer flows are generated by a user request or a detected status change in the network, and the policy server further comprises:

a unit for searching for at least two different routes for new layer 2 paths to transfer the new packet flows, for generating the new layer 2 paths far transferring the new packet flows, and for designating one of the new layer 2 paths as a working path and the other as a spare path in accordance with resource utilization conditions of each physical line as collected beforehand, and a unit for instructing the ingress node to switch from the working path to the spare path, based on a judgment of at one of the plurality of the label switch nodes when the at one of the plurality of the label switch nodes detects a failure in the working path.

18. The policy sewer of claim 17, further comprises:

a unit for instructing the ingress node to use the spare path for other traffic when the working path is normally operating, and to stop the other traffic from using the spare path and to make the spare path accommodate traffic which the working path was carrying when a failure arises in the working path.

19. The policy server of claim 11, wherein the packets are IP packets, and the policy server further comprises:

a unit for defining logical groups, having group identifiers, to which a plurality of IP flows belong when one of the layer 2 paths transfers the IP packets corresponding to a plurality of different IP flows, a unit for specifying the plurality of IP flows belonging to the group by the group identifiers when one of the layer 2 paths is switched, and a unit for giving instruction to the ingress node so that IP flows and the layer 2 paths match with each other, using the group identifiers when one of the layer 2 paths is switched.

20. A method for setting up and selecting layer 2 paths for transferring IP packets in a label switch network system having a plurality of label switch nodes interconnected by network links where layer 2 paths are set up by specified routes between the plurality of label switch nodes from a network ingress to a network egress, and an ingress node disposed at the network ingress of the label switch network system that transfers the IP packets corresponding to IP flows based on labels; the method comprising the steps of:

detecting user requests and status changes in the network, determining, when transferring the IP packets in the ingress node, whether existing layer 2 paths are selected to transfer the IP packers or new layer 2 paths following appropriate routes are to be newly set up, calculating appropriate routes far the layer 2 paths including quality assurance parameters, instructing the ingress node to set up the layer 2 paths in compliance with policy control protocols, wherein the ingress node sets un the layer 2 pats between the plurality of label switch nodes from the network ingress to the network egress, base on an instruction given by a policy server; and transferring the IP packers with reference to the header or payload information of the packets.

21. The method of claim 20, further comprising the steps of:

notifying the policy server of the user requests or the status changes in the network, and in the policy server, instructing the ingress node to set up the layer 2 paths for transferring the IP packets corresponding to newly generated IP flows, in response to the notifying step.

22. The method of claim 21, further comprising the step of:

in the policy server, specifying one of the plurality of label switch nodes through which a layer 2 path will pass through in accordance wit an IP address corresponding to the one of the label switch nodes.

23. The method of claim 21, further comprising the steps of:

generating new IP flows based on a user request or a detected status change in the network, balancing resource utilization conditions of each physical line by searching for routes that will keep the resource utilization conditions of each physical line balanced when adding the new IP flows when a plurality of the layer 2 paths exist through which IP flows can pass, and instructing the ingress node to set up the layer 2 paths that can transfer the new IP flows generated.

* * * * *

UNITED STATES PATENT AND TRADEMARK OFFICE
CERTIFICATE OF CORRECTION

| | | |
|---|---|---|
| PATENT NO. | : 7,035,259 B2 | Page 1 of 2 |
| APPLICATION NO. | : 09/800150 | |
| DATED | : April 25, 2006 | |
| INVENTOR(S) | : Yuji Nomura et al. | |

It is certified that error appears in the above-identified patent and that said Letters Patent is hereby corrected as shown below:

Claim 3 column 17, line 38: "-detects die user request-" should be changed to --detects the user request--.

Claim 7 column 18, line 15: "-newly generated packer-" should be changed to --newly generated packet--.

Claim 7 column 18, line 20: "-packer flows-" should be changed to --packet flows--.

Claim 7 column 18, line 23: "-transferring he new packer-" should be changed to --transferring the new packet--.

Claim 8, column 18, line 30: "-the policy sewer has-" should be changed to --the policy server has--.

Claim 8, column 18, line 31: "-to transfer The new-" should be changed to --to change the new--.

Claim 8, column 18, line 34: "-as a working pat and-" should be changed to --as a working path and--.

Claim 10, column 18, line 54: "-a plurality of different packer flows-" should be changed to --a plurality of different packet flows--.

Claim 10, column 18, line 60: "-the plurality of packer flows-" should be changed to --the plurality of packet flows--.

Claim 11, column 19, column 19, line 23: "-by the policy serves.-" should be changed to --by the policy server.--.

Claim 16 column 19, line 61: "-sewer detects newly generated packet flows-" should be changed to --server detects newly generated packet flows--.

Claim 16 column 20, line 3: "-the new packer flows-" should be changed to --the new packet flows--.

Claim 17 column 20, line 8: "- new packer flows-" should be changed to -- new packet flows--.

Claim 18 column 20, line 23: "-the policy sewer of claim 17,-" should be changed to --the policy server of claim 17,--.

UNITED STATES PATENT AND TRADEMARK OFFICE
CERTIFICATE OF CORRECTION

PATENT NO. : 7,035,259 B2
APPLICATION NO. : 09/800150
DATED : April 25, 2006
INVENTOR(S) : Yuji Nomura et al.

It is certified that error appears in the above-identified patent and that said Letters Patent is hereby corrected as shown below:

Claim 20, column 20, line 61: "-ingress node sets un the layer 2 pats-" should be changed to --ingress node sets up the layer 2 paths--.

Claim 20, column 20, line 63: "-base on an instruction-" should be changed to --based on an instruction--.

Claim 20, column 20, line 65: "-the IP packers with reference to-" should be changed to --the IP packets with reference to--.

Claim 21, column 21, line 13: "-in accordance wit an IP address-" should be changed to --in accordance with an IP address--.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,035,259 B2 |
| APPLICATION NO. | : 09/800150 |
| DATED | : April 25, 2006 |
| INVENTOR(S) | : Yuji Nomura et al. |

It is certified that error appears in the above-identified patent and that said Letters Patent is hereby corrected as shown below:

Claim 8, column 18, line 31: "-to transfer The new-" should be changed to -- -to transfer the new- --.

Signed and Sealed this

Twentieth Day of May, 2008

JON W. DUDAS
*Director of the United States Patent and Trademark Office*